J. E. MATSON.
POWER DRIVEN VEHICLE.
APPLICATION FILED NOV. 21, 1911.
1,100,595.
Patented June 16, 1914.
6 SHEETS—SHEET 1.
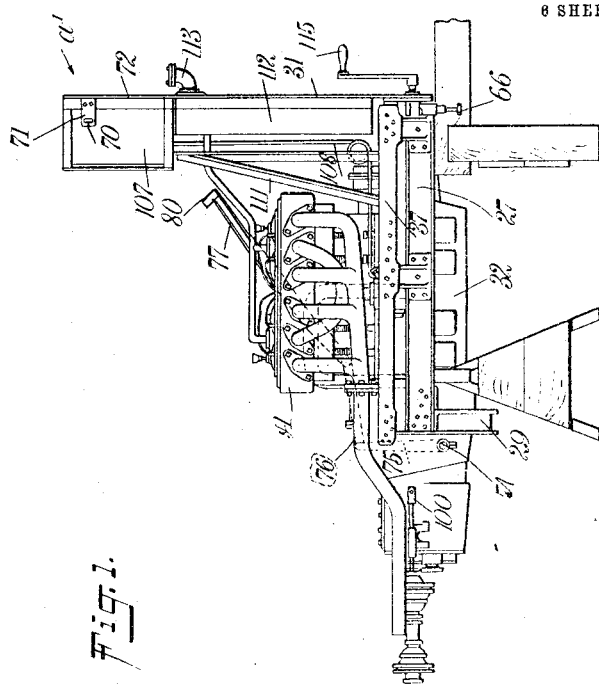
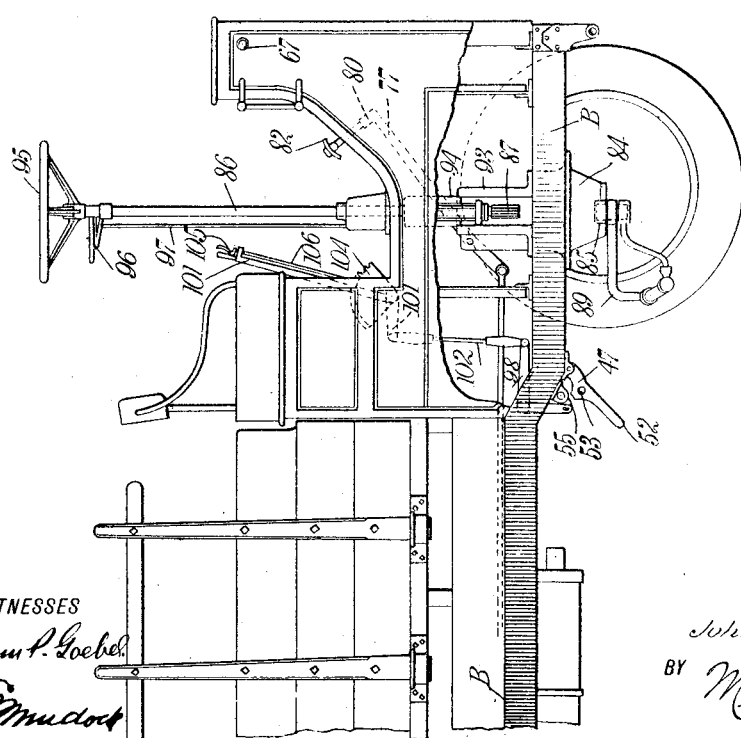
WITNESSES
INVENTOR
John E. Matson
BY
ATTORNEYS

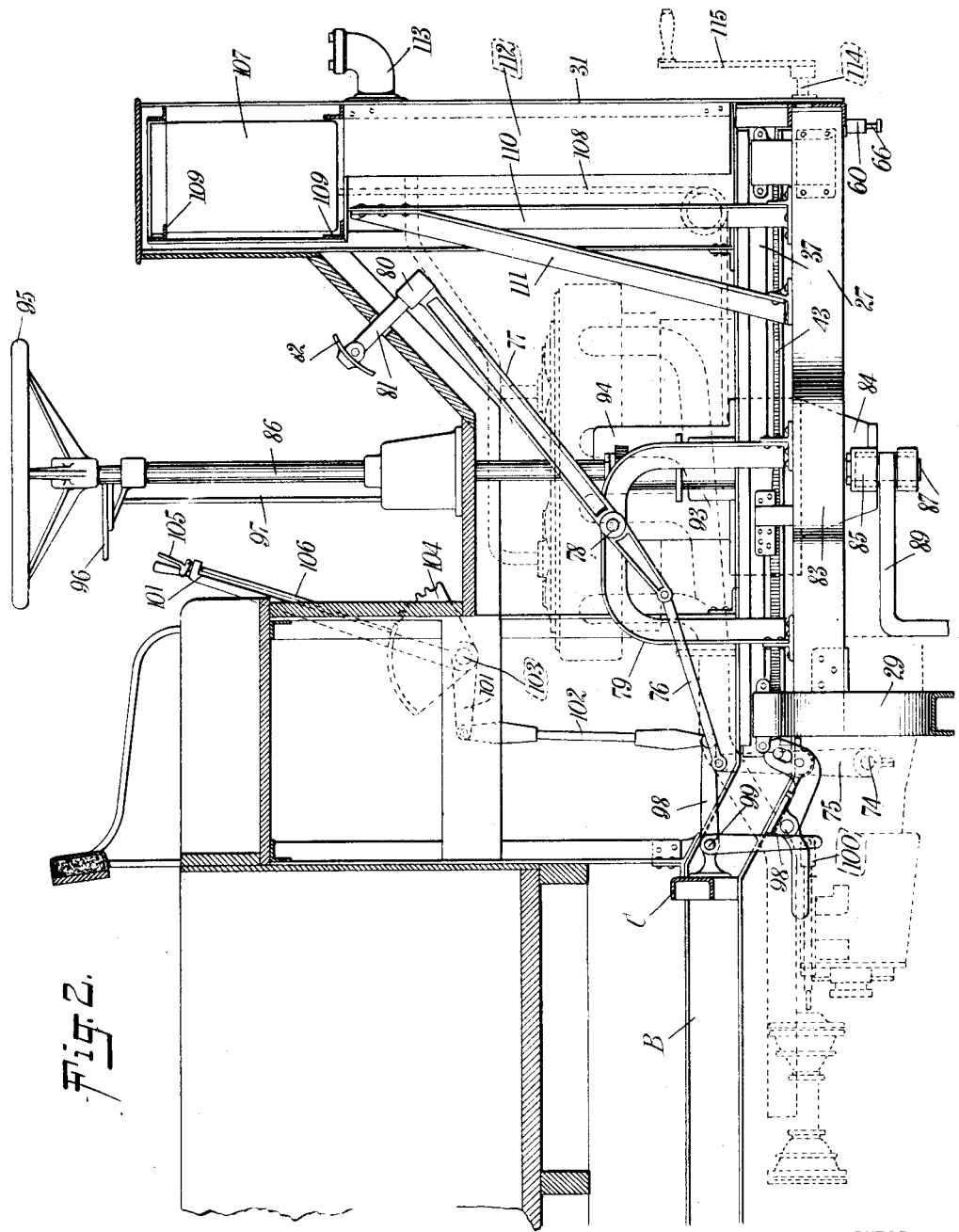

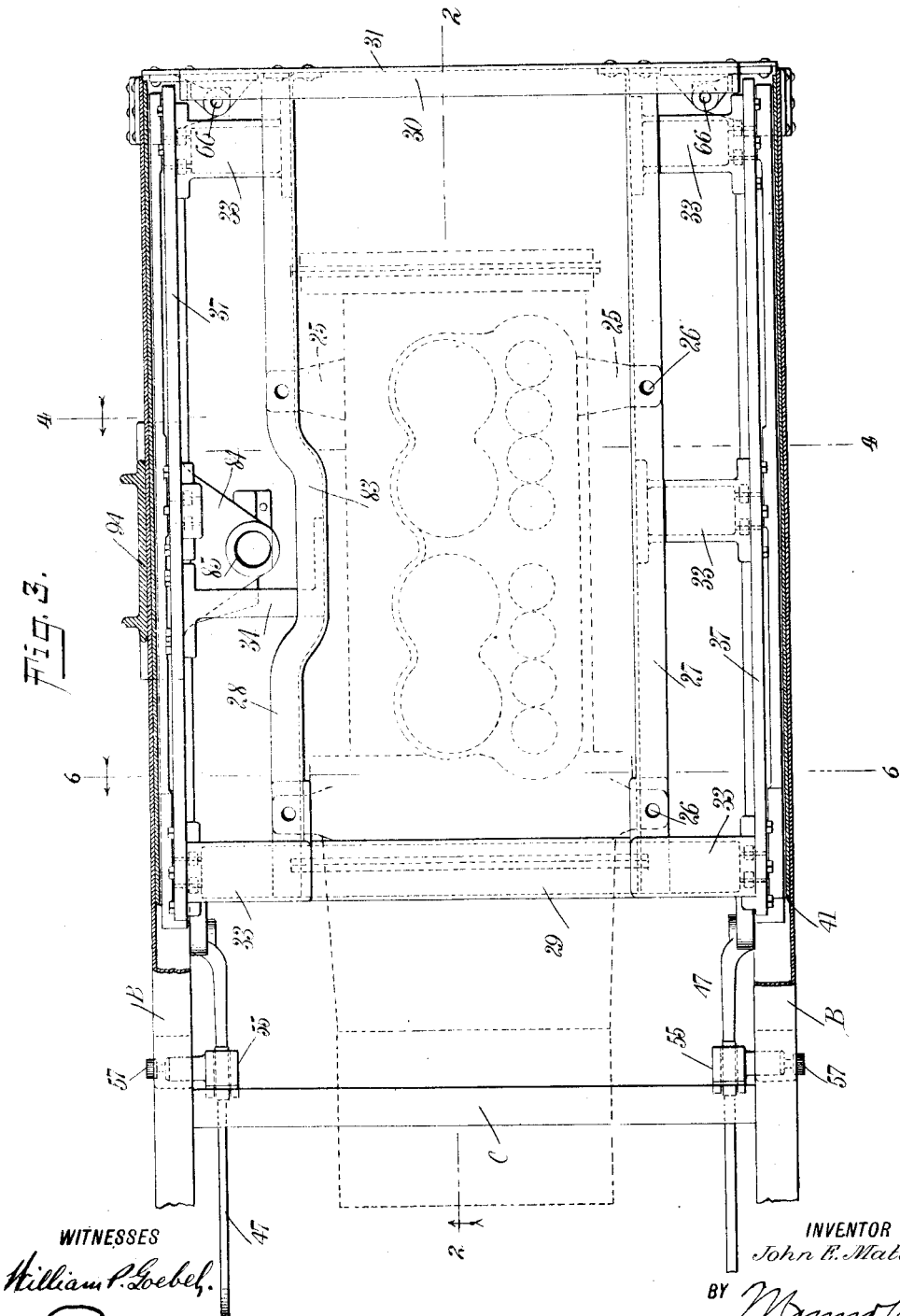

J. E. MATSON.
POWER DRIVEN VEHICLE.
APPLICATION FILED NOV. 21, 1911.
1,100,595.
Patented June 16, 1914.
6 SHEETS—SHEET 4.
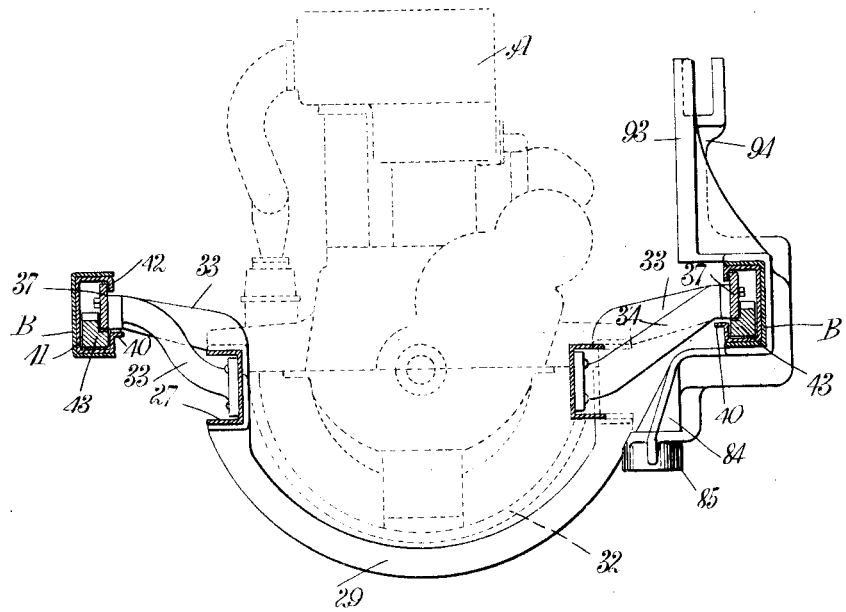
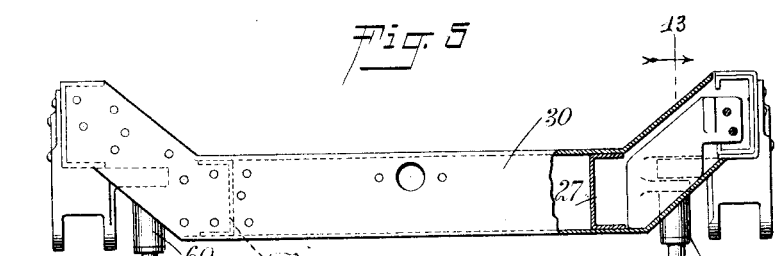
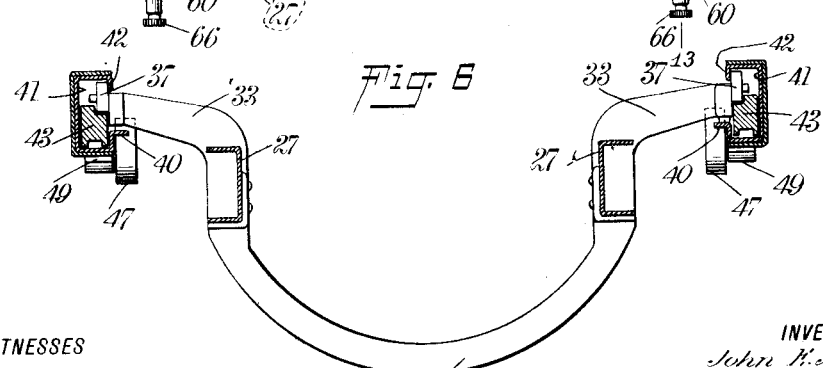
WITNESSES
INVENTOR
John E. Matson
BY
ATTORNEYS

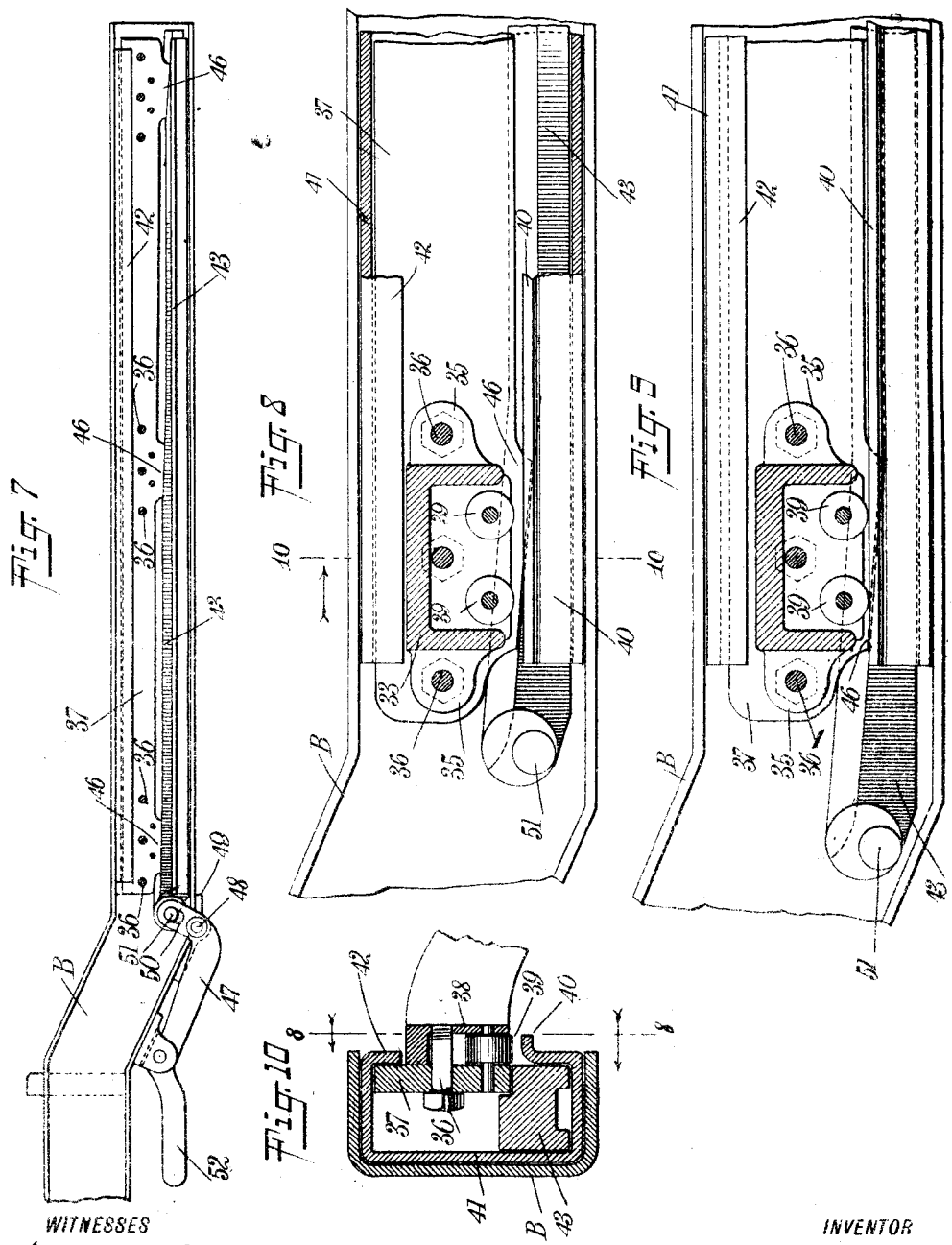

J. E. MATSON.
POWER DRIVEN VEHICLE.
APPLICATION FILED NOV. 21, 1911.
1,100,595.
Patented June 16, 1914.
6 SHEETS—SHEET 6.
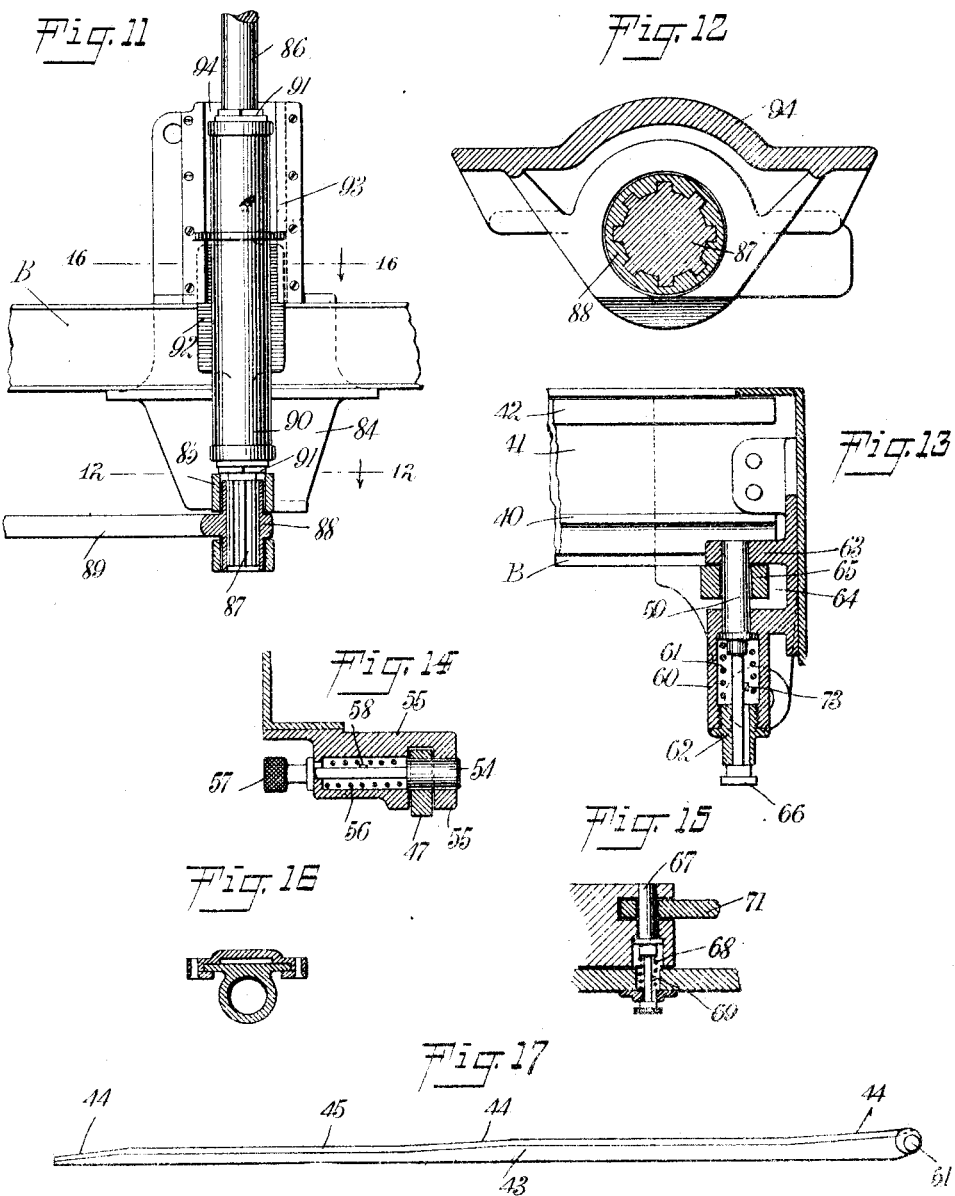

UNITED STATES PATENT OFFICE.

JOHN E. MATSON, OF SANDUSKY, OHIO, ASSIGNOR TO SANDUSKY AUTO PARTS & MOTOR COMPANY, OF SANDUSKY, OHIO.

POWER-DRIVEN VEHICLE.

1,100,595.  Specification of Letters Patent.  Patented June 16, 1914.

Application filed November 21, 1911. Serial No. 661,591.

*To all whom it may concern:*

Be it known that I, JOHN E. MATSON, a citizen of the United States, and a resident of Sandusky, in the county of Erie and State of Ohio, have invented a new and Improved Power-Driven Vehicle, of which the following is a full, clear, and exact description.

Among the principal objects which the present invention has in view are: to provide a complete power unit, having a one-unit frame, and in operative relation a prime mover, transmission mechanism, fuel-supply, and controlling devices, with means for readily and rapidly installing said unit in operative position, and for removing the same from said position; to provide a vehicle chassis and a power unit such as above-noted, constructed and arranged to facilitate the installation of said unit upon, and its removal from, said chassis; and to provide means for rapidly locking said chassis and power unit in operative relation.

Reference is to be had to the accompanying drawings forming a part of this specification, in which similar characters of reference indicate corresponding parts in all the views, and in which—

Figure 1 is a pictorial view showing in side elevation the forward fragment of a vehicle and a power unit constructed and arranged in accordance with the present invention as having been removed from the vehicle and held on suitable rests independent of the vehicle, part of the side of said vehicle being broken away to disclose controlling devices for the unit left in position on the vehicle; Fig. 2 is a longitudinal section taken on the line 2—2 in Fig. 3, on an enlarged scale, showing the forward fragment of the vehicle with the power unit installed therein; Fig. 3 is a horizontal section of the forward portion of a vehicle chassis, showing the frame directly supporting the power unit as installed in the said chassis; Fig. 4 is a vertical cross section taken on the line 4—4 in Fig. 3; Fig. 5 is a front view of the cross bar of the supporting frame partly broken away to show construction; Fig. 6 is a cross section taken on the line 6—6 in Fig. 3; Fig. 7 is a detail view showing a forward fragment of one of the side bars of the chassis, together with a supporting bar for the power unit; Fig. 8 is a detail view, on an enlarged scale, showing the construction of the carrying devices for the power unit, and means for supporting the said unit in operative position, said view being partly in section, the section being taken on the line 8—8 in Fig. 10; Fig. 9 is a view similar to Fig. 8, showing the supporting frame for the power unit as resting on the guide track prior to removal from the vehicle; Fig. 10 is a cross section of a side bar of the chassis and the supports for the supporting frame of the power unit, the section being taken on the line 10—10 of Fig. 8; Fig. 11 is a detail view, partly in section, showing the lower end of the tiller post and the coupling thereof, with the steering mechanism of an automobile; Fig. 12 is a detail view, on an enlarged scale, taken on the line 12—12 of Fig. 11; Fig. 13 is a detail view, in vertical section, showing one of the locking pins for the front bar of the supporting frame and power unit; Fig. 14 is a detail view in horizontal section, showing the locking pin for securing the locking lever for the power unit in locking position; Fig. 15 is a detail view in cross section, showing the locking pin for securing the upper section of the power unit in the vehicle; Fig. 16 is a cross section, taken on the line 16—16 of Fig. 11; and Fig. 17 is a detail view in side elevation, of one of the lifting wedges for the power unit.

The power unit as seen in the accompanying drawings embodies a motor, transmission, fuel-supply, and accessories to said elements, supported upon an independent frame or base, to be installed and removed from the chassis of an automobile or other installation as a single element. When installed, the various manual controls and transmission couplings are connected with the operating station and driving shaft of the driven mechanism.

The distinguishing feature between the present invention and the established art exists in that the complete unit may be installed or removed ready for operation quickly and readily, involving in the operation no separation of the separate elements of the unit; that is to say, when the unit is removed from its service location, it may be operated to perform its immediate, individual and complete functions.

The employment of the assembled unit as distinguished from the installed driving mechanism permits the removal of a power unit for repair, disassociated from, and relieved from, the interference of the vehicle structure; the replacement or substitution of one unit for another, in service, in conjunction with an automobile or other motor vehicle; thus saving the loss of time in the service of a vehicle of the character mentioned. Also, there is permitted in the use of a power unit such as herein disclosed, a series of vehicles similarly or variously styled, adapted for the installation of the same power unit, thereby limiting the cost of vehicles of this character. In the latter employment, it will be understood that the installation and disposition of the fixed members of the controlling mechanism employed in conjunction with the power unit, is standardized in the various vehicles.

The motor A shown in the accompanying drawings is constructed and arranged in any approved manner. Any type of motor suitable to the purposes for which it is intended may be employed in this connection. The motor shown is provided with suspension brackets 25. The brackets 25 are provided with bolt-holes, to register with bolt-holes 26, 26, formed in the engine bars 27 and 28. The bars 27 and 28 are structurally united with end bars 29 and 30, suitable corner brackets or other structural devices being employed to unite the said bars. The bar 30 is provided with a face-plate 31, which face plate and the bar 30 are preferably straight, forming as they do the lower edge of the front part of the completed vehicle. The bar 29 is bowed, as best seen in Fig. 1, to evade the engine case 32. The bars 27, 28, 29 and 30 primarily constitute the sub-frame or power unit supporting base.

To support the power unit base on the side bars B, B, of a motor vehicle chassis, there is provided a suitable number of laterally-extended brackets 33, 33, and 34. The brackets 33 and 34 are at the outer ends provided with bolting tabs 35, to receive the bolts 36 wherewith the brackets are secured to the rails 37. Between the cross wall 38 with which each of the brackets is provided and the rail 37 are disposed a plurality of rollers 39. Said rollers are gudgeoned and mounted in bearings formed in the same partition and rail, as best seen in Fig. 10 of drawings. The rollers 39 are provided to carry the power unit supporting base when the same is being moved into and out of the installation space of the vehicle. The rollers 39, when so acting, track on the rails 40 formed by overturning the upper edge of a lower flange box channel 41. The box channel 41, at the upper edge, is provided with a flange 42, which is employed to guide the rail 37 during the movement into and out of the installation space of the power unit.

The box channel 41 is open-ended, and is held rigidly in the channel of the side bar B of the chassis. In the preferred form of the vehicle equipped with this invention, the chassis frame is dropped, as seen best in Fig. 7 of drawings, to facilitate handling the power unit.

To steady the sub-frame, there are provided means for lifting the frames to clear the rollers 39 from contact with the rails 40. The means employed are two wedge-bars 43. The wedge-bars 43 are slidably mounted in the lower portion of the box channel 41. Each bar 43 is provided at various stations in its length with inclines 44. The portions of the bars 43 intermediate each of the inclines 44 are preferably parallel with the bottom of the said bars. The upper and inner edge of each bar 43 is rabbeted to form a runway 45. The vertical wall of the runway 45 in each of the bars 43 forms lateral guides for the rails 37. In the retracted position of the bars 43, the foot-rests 46 of the rails 37 rest above the parallel or level portions of the bars 43. In this position, the rails 37 and frame connected therewith are supported by the rollers 39, which rest upon the rails 40. In the forward or operative position of the bars 43, the inclines 44 extend under the foot-rests 46 and wedge upward on said foot-rests, rails and members connected therewith, to lift the rollers 39 off the track, and to hold firmly in position the power unit base frame.

The movements of the wedge bars 43 are effected by the levers 47, of which there are two, one located at each side of the chassis. The levers 47 are each pivotally mounted upon stub shafts 48, which shafts are extended over bolting plates 49 secured rigidly to the side bars B of the chassis. The short arm of the lever 47 is furnished with an elongated slot 50, into which slot extends the stud 51. The stud 51 is rigidly connected with, or integrally formed upon, the wedge bars 43. The long arm of the lever 47 is provided with a hand-grip 52 and a perforation 53, which forms a seat for the latch bolt 54 mounted in a bracket 55. The bracket 55, as seen in Fig. 14, is bored to form a pocket to hold a spiral spring 56, the normal operation whereof throws the bolt 54 to the position shown in Fig. 14, to lock the lever 47 in operative position. The bolt 54 is retracted to release the lever 47 by means of a head 57. When it is desired that the bolt 54 shall be maintained in position to clear the slot in the bracket 55 provided for the lever 47, this is accomplished by withdrawing the bolt 54 until the pin 58 is withdrawn beyond the end of the bracket 55, to rest against the outer surface thereof. In this position, by turning the bolt 54, the same is disposed in position where the pin 58 rests upon the outer surface of the bracket 55, and holds the bolt retracted from the slot formed in the said bracket. In the normal position of the bars 43, where the same support the rails 37 and parts connected therewith, the lever 47 is disposed in the position shown in full-lines in Fig. 2. When the bars 43 are retracted, the lever 47 assumes the position shown in full-lines in Fig. 1.

When the power unit supporting frame is installed within the chassis, it is locked therein by means of latch-bolts 59, best seen in Fig. 13 of the drawings. The bolts 59 are mounted in brackets 60. The brackets 60 are bored to form pockets for spiral springs 61, which normally rest between the bolts 59 and the ends of the screw plugs 62, which close the end of the bores of the brackets and form a seat for the springs 61. Above the brackets 60 are guide plates 63. The plates 63 are provided with perforations to aline with the perforations formed in the brackets 60 for the guidance of the bolt 59. The plates 63 and brackets 60 are separated to form a channel 64, into which is extended a lug 65. The lugs 65, of which there are two, are each projected from the side bars B of the chassis, being rigidly connected therewith. The lugs are each provided with a perforation to register with the perforations in the plate 63 and bracket 60.

The bolt 59 is provided with a head 66, by which it is retracted to clear the channel 64. The bolt is also provided with a holding pin 73, similar in construction and operation to the pin 58 above described. When the power unit supporting base frame is introduced into the chassis, the bolts 59 are released, to engage the perforations of the lugs 65 preliminary to operating the levers 47. In the subsequent operation of the levers 47, the forward thrust of the wedge bars 43 is resisted by the bolts 59, causing the rails 37 to lift in a vertical line.

The superstructure of the unit is locked in position to the front frame or dash of the automobile, when constructed as shown in Fig. 1 of the drawings, by means of a latch bolt 67, which, as shown in Fig. 15, is provided with a spiral spring 68 and a hold-pin 69, the operation whereof serves to seat the said bolt in an elongated slot 70 formed in a latch plate 71. There are two latch plates 71, one of which is disposed at each side of the face-plate 72 of the herein-described unit.

It will be understood that in the operation of introducing into position, or withdrawing from position, the unit, the bolts 59 and 67 are preliminarily withdrawn to clear the lugs 65 and plates 71, and held in this position by rotating the same, to dispose the pins 73 and 69 to engage the outer end of the bores provided for said bolts. The bolts 59 and 67 being thus disposed of, the bolt 54 is then retracted and releases the lever 47. The lever 47 may now be moved to the position shown in Fig. 1, to effect the withdrawal of the bars 43 from under the foot-rests 46 of the rails 37. This results in disposing the power unit supporting base on the rollers 39 and rails 40.

When the unit is introduced upon the chassis, it is necessary to connect the transmission shaft of the said unit with the driving shaft of the vehicle. Any suitable form of coupling may be employed for this purpose. It is also necessary to connect some form of manually-operated mechanism with the controlling device for the clutch provided in the said unit. As seen in the present drawings, the rocking shaft 74 of the clutch mechanism is engaged by a lever 75, suitably disposed thereon and operatively connected by means of a rod 76, with a foot-operated lever 77. The lever 77 is pivotally mounted upon the stud shaft 78 set out from a supporting yoke 79. At the upper end of the lever 77 is furnished a socket 80, to receive a foot plunger 81, which plunger is provided with a pedal 82, as seen best in Fig. 2 of drawings. The disposition of the plunger 81 and the socket 80, as seen in the figure referred to, is such that when the unit is drawn from the housing provided in the vehicle, the socket clears itself of the engagement with the plunger 81. Also, it will be understood that when the unit is re-installed in operative position in the housing, the plunger may be readily and easily adjusted to the socket 80.

The yoke 79, above-mentioned, straddles the offset section 83 of the bar 28. The offset 83 is thus provided to clear the end of a drop-bracket 84. The bracket 84 is extended through the longitudinal median line of the supporting frame, and is provided with a socket collar 85. The collar 85 serves as a guide for the lower end of the steering post 86. The steering post 86 is, at the lower end, provided with a splined section 87. The splined section 87 engages a grooved chuck 88 upon the end of the steering arm 89. The steering arm 89 is connected, in the usual manner, with the steering wheels of the vehicle. It will be noted that the bracket 84 and collar 85, chuck 88 and steering arm 89 are connected directly with the structure of the vehicle. To permit the brackets 33 and 34 on the power unit supporting base to pass out of the housing, it is necessary that the steering post and the socket 90 be lifted from the path of the said brackets. It is for this reason that the post 86 is mounted in the socket 90, being permanently held therein by lock nuts 91, 91. The socket 90 is offset from the guide plate 92, the extensions whereof rest under the overhung rails 93. The rails 93 are bolted to the supporting plate 94 of the bracket 84. The bracket 84 and supporting plate therefor, it will be noted, are shaped to infold the side bar B of the chassis, thus leaving the channel in the said side bar and in the box channel, clear for the movement of the said brackets 33 and 34.

The construction shown and described permits the lifting of the steering post 86 and the steering wheel 95 and control wheel 96 mounted thereon. When the steering post and parts connected therewith are lifted, as shown in Fig. 1 of drawings, the power unit is free to move in and out of the housing. When the unit has been moved into the housing and there adjusted, the steering post and parts connected therewith are lowered on splines of the section 87 registering with the grooves in the chuck 88 of the steering arm. In this position, the automobile may be steered in the usual manner.

The control wheel is provided with the usual connecting rods 97 and device for operating the same to vary the operative conditions of the carbureter and magneto with which the motor is provided. It will be understood that the connections between the connecting rods 97 and the said carbureter and magneto are made after the power unit has been installed.

By reason of the fact that the bell-crank-lever 98 is pivoted at 99 on the cross bar C of the chassis, the lower arm thereof must be connected to a pitman 100 after the power unit is installed in its housing, and disconnected from the said pitman prior to its removal from said housing. Any suitable form of connection, such as a cotter-pin or equivalent device is employed for connecting the lever 98 and pitman 100. The lever 98 is operatively connected with a hand lever 101 by means of a connecting rod 102. The lever 101 is pivoted at 103, and is held in adjusted position by means of a quadrant 104, a hand-grip lever 105 and a bolt 106 being provided to lock the hand-lever 101 to the said quadrant. The pitman 100 is a part of the gear-changing mechanism. It will be understood that the gear-changing mechanism may be of any suitable and usual type.

The superstructure of the power unit, as above referred to, embodies the fuel tank 107, from which the gasolene or suitable explosive is conveyed to the carbureter through the delivery pipe 108. The tank 107 is of any approved and usual construction, and is held by a supporting frame composed of angle-bars 109. The frame composed of the angle-bars 109 is held above the motor A by upright framing members 110, braces 111 and the face plate 31. The members 110 and braces 111, together with the face plate 31, are supported upon the bars 27, 28 and 30.

The radiator 112 is vertically disposed, as seen in the drawings, and is secured to the face plate 31. The pipes constituting part of the water-circulating system are not shown in the present drawings.

The preferred form of body construction for vehicles employing the power unit of the character set forth is provided with a raised platform and chauffeur's seat, having a dash, lifted as shown in the drawings, the platform, foot-rest and dash being designed to form a receptacle or housing for the power unit when run onto the rails 40. The face-plate 31 is designed to close the forward opening of this housing, to protect and conceal the operative parts of the power unit. Provision is made in the plate 31 for the extension therethrough of a nipple 113, which nipple is employed for filling the radiator 112. Provision is also made for the extension through the said plate of the crank-shaft 114, whereon is mounted the crank handle 115.

From the foregoing, it will be understood that a complete power element mounted upon its individual base, and carrying its fuel, water-supply, and operating and controlling devices, is here employed, in a manner to be placed in service or withdrawn therefrom quickly and simply; that a vehicle having a body construction arranged to form a housing for the unit is employed therewith, the face-plate of the unit closing the said housing; and that the body of the vehicle is furnished with manually-operated devices, whereby the prime mover of the unit is controlled, the control being effected in substantially the manner at present employed.

Where, in the above description and in the following claims, the expression "power unit" is employed, it is meant to include as a single element a unit-supporting frame or base, a prime mover, a fuel or power supply, a driving shaft and transmission mechanism therefor, various controls for limiting or altering the fuel-supply, motor regulation, and clutch and gear for said transmission mechanism. In other words, a completely operable and controllable mechanism when detached from the vehicle or normal operative connections. By the expression "unit base" is meant any form of supporting construction for the unit which binds the elements of the unit in one structural mass. By the term "controls" is meant any suitable form of mechanism or devices for controlling or altering the supply of fuel; for controlling or altering the ignition in the engine; for controlling the clutch connecting the driving and crank shaft; and for controlling the change-gears of the transmission.

Having thus described my invention, I claim as new and desire to secure by Letters Patent:—

1. A vehicle such as described, having side bars; supporting rails formed on said side bars, a complete power unit having a single base arranged to move upon said rails; means for locking said base in relatively fixed position on said rails; and a housing for said unit, supported upon said bars, said unit being provided with a face-plate to close the opening in said housing, said face-plate adapted to support the fuel-tank and radiator of said unit.

2. In a vehicle such as described, a body frame; supporting rails mounted on said frame; a power unit having a supporting base; carrying wheels for said base, arranged to track upon said rails; a plurality of wedge-bars adapted to lift said base to move the wheels from said rails; means for reciprocating said bars to raise and lower said base; and means for locking said base in relatively fixed position.

In testimony whereof I have signed my name to this specification in the presence of two subscribing witnesses.

JOHN E. MATSON.

Witnesses:
 DANIEL E. STORMS,
 GEORGE W. MATSON.